Feb. 13, 1951 W. A. MUELLER ET AL 2,541,271
SUPPORT FOR VEHICLE VISORS
Filed Jan. 22, 1947 2 Sheets-Sheet 1
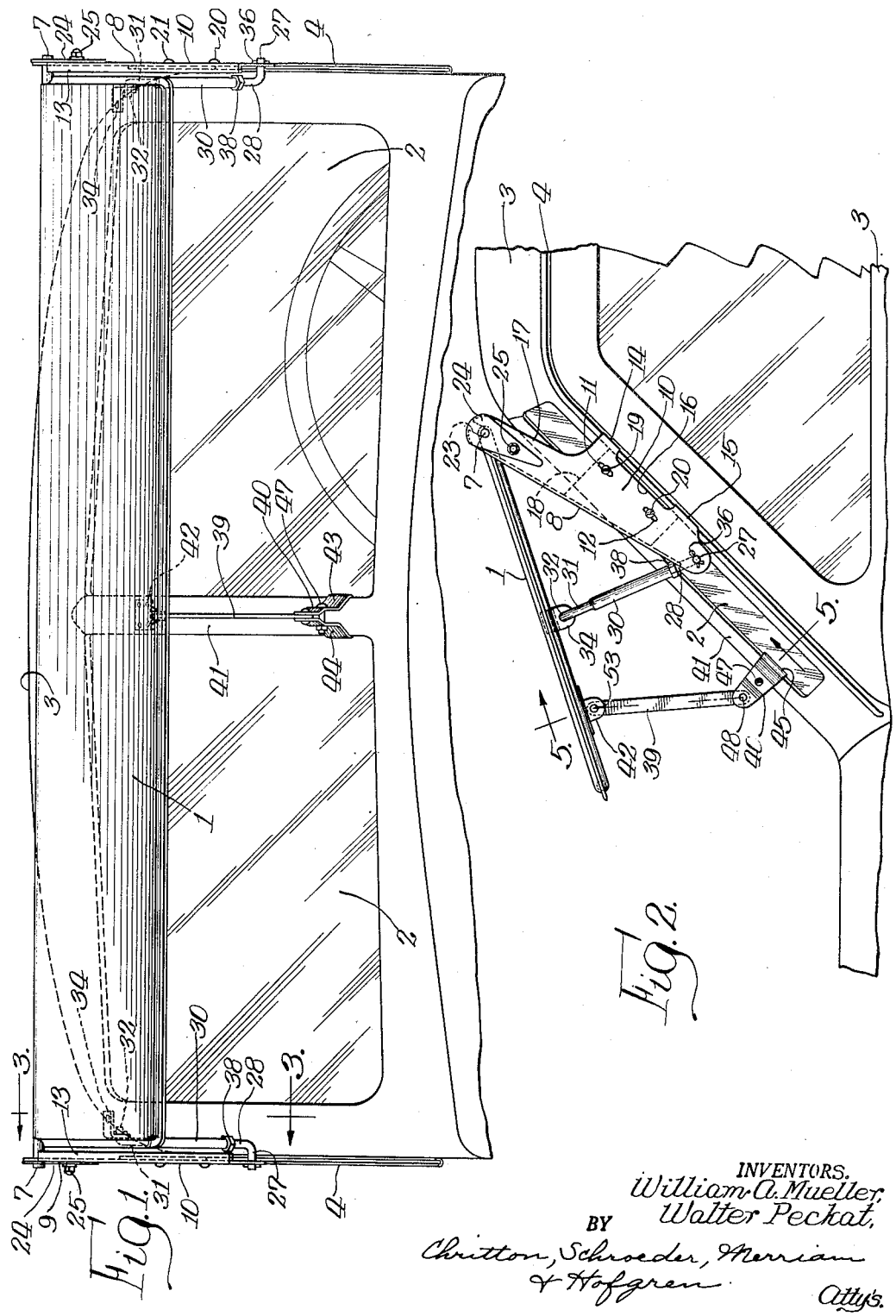
INVENTORS.
William A. Mueller,
Walter Peckat,
BY Chritton, Schroeder, Merriam & Hofgren
Attys.

Feb. 13, 1951 W. A. MUELLER ET AL 2,541,271
SUPPORT FOR VEHICLE VISORS
Filed Jan. 22, 1947 2 Sheets—Sheet 2
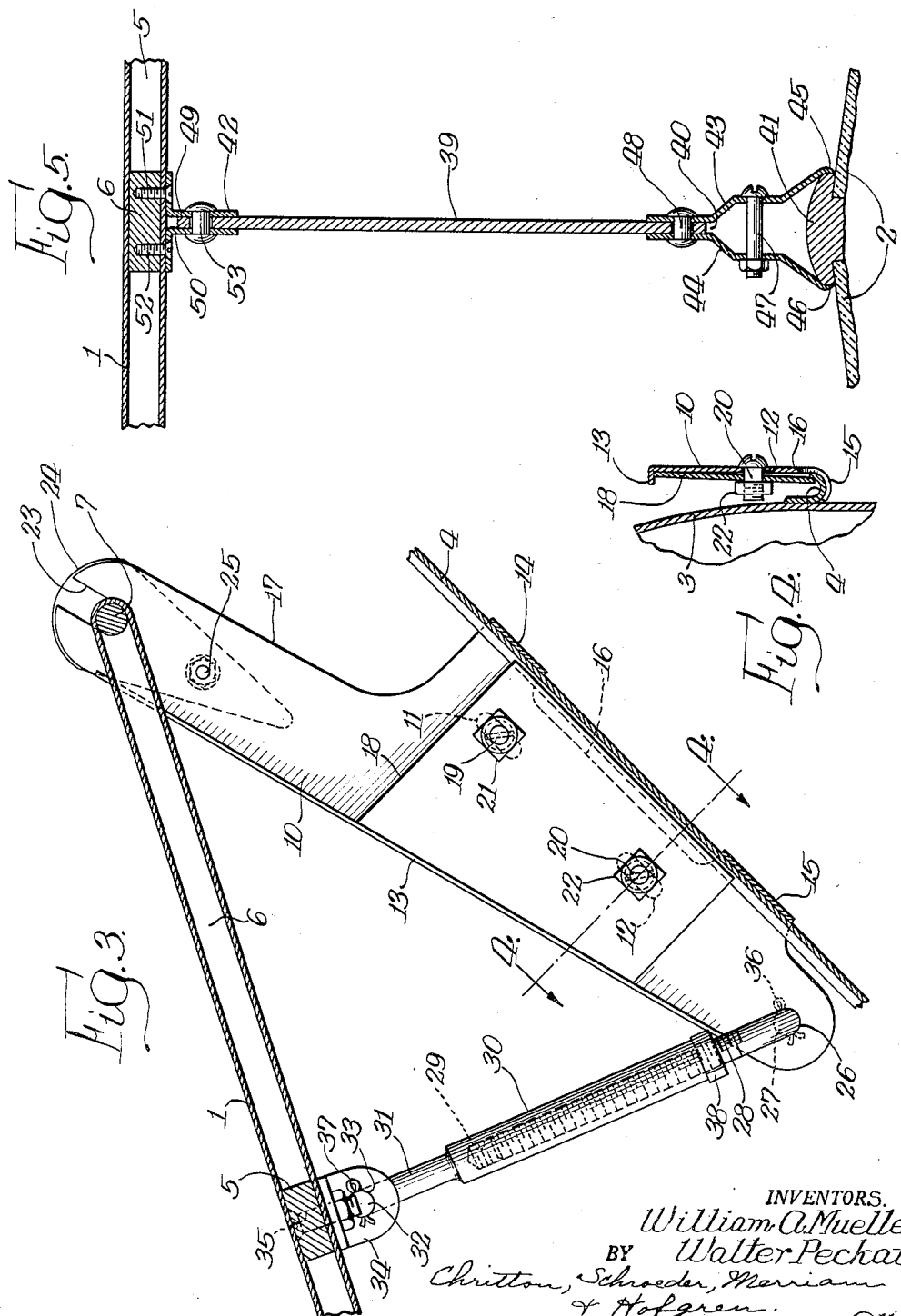
INVENTORS.
William A. Mueller,
Walter Pechat,
BY Chritton, Schroeder, Merriam
& Hofgren.
Attys.

Patented Feb. 13, 1951

2,541,271

UNITED STATES PATENT OFFICE 2,541,271

SUPPORT FOR VEHICLE VISORS

William A. Mueller, River Forest, and Walter Peckat, Riverside, Ill., assignors to Charles Peckat Manufacturing Company, a corporation of Illinois Application January 22, 1947, Serial No. 723,594

5 Claims. (Cl. 296—95)

This invention relates to an awning for the windshield of an automobile, and more particularly to improved supporting and adjusting means therefor.

The present invention is an improvement over that of United States Letters Patent No. 2,180,909, granted November 21, 1939 to Charles Peckat for "Awning for Automobiles."

Among the objects of the present invention are: to provide a novel and improved awning for automobiles; to provide apparatus for supporting an awning of an automobile and having novel means for adjusting the angle of the awning with relation to the windshield; to provide improved brackets for adjustably supporting an awning over a windshield; to provide axially adjustable supporting means between the brackets and the awning; to provide a slide member longitudinally adjustable along the middle bar of the windshield, and a link pivotally connected to the slide member and the awning; to provide an automobile awning supporting bracket having one edge provided with a recess to form a plurality of spaced apart flanges; and such further objects, advantages and capabilities, inherently possessed by our invention, as will later more fully appear.

Our invention further resides in the combination, construction and arrangement of parts illustrated in the accompanying drawings, and while we have shown therein for illustrative purposes only, a preferred form, we wish it understood that the same is susceptible of modification and change without departing from the spirit of our invention.

In the drawings:

Fig. 1 is a fragmentary front elevation of an automobile windshield and associated parts, and showing our invention applied thereto.

Fig. 2 is a fragmentary side elevation of a portion of the front of an automobile having our improved awning supporting means applied thereto.

Fig. 3 is an enlarged vertical section on the line 3—3 of Fig. 1.

Fig. 4 is a transverse section on the line 4—4 of Fig. 3.

Fig. 5 is a transverse section on the broken line 5—5 of Fig. 2.

In the designs of modern automobiles, the windshield is positioned at a considerable slope, as a result of which, if the automobile is not provided with a windshield awning, the sun may shine during a large portion of the day rather directly on the knees and lap of the driver and other passengers in the front seat. The present invention and the said earlier Peckat Patent 2,180,909 provide means for so mounting an awning over the windshield as to prevent the sun's rays from striking the driver and front seat passengers, but yet permit ample vision by the driver and passengers of the road ahead.

In the form shown for illustrative purposes in the drawings, our invention comprises, an awning 1 extending forwardly of the windshield 2 of an automobile having a body 3 provided along its outer upper sides with a rain gutter 4 which continues forwardly and downwardly adjacent the ends of the windshield.

The awning is here shown as comprising a section extending from one end of the windshield to the other, which section may be flat, or formed at a slight angle from the ends to the center, as desired. Rubberized canvas or other suitable material may be used in the construction of the top and bottom of the awning, such canvas or other material being fixed in any desired manner to frame members 5 and 6 extending around the edges of the awning and at other portions where a supporting connection is desired. The framing may be omitted along the rear edge where is provided a cross rod 7. The awning is preferably positioned so that the rear bar 7 is spaced above and away from the top of the automobile, as may be best seen in Fig. 2, to permit the passage of air therethrough while the automobile is being driven. As seen in Fig. 2, the rear edge of the awning is preferably located substantially directly above the top edge of the windshield, and so that the awning extends sufficiently far forwardly of the bottom of the windshield to provide the desired protection against sun, even in the early morning or late afternoon.

Supporting means in the form of brackets 8 and 9 are secured at the desired location to the gutters 4 in a manner more fully described hereinafter. As will be understood, there is one of these brackets on each side of the automobile adjacent the respective ends of the windshield. As these two brackets 8 and 9 are alike, except for being reversed so that one can be positioned on the right hand side of the front of the automobile and the other upon the left hand side of the front of the automobile, only one of them will be described in detail, and the same reference numerals used on corresponding parts of both thereof.

Referring more particularly to Figs. 2 and 3, these brackets are each formed of a body portion 10 of flat heavy gauge sheet metal, the longitudinal edges being formed at an angle to each other to add strength and rigidity, and to enable attachment to the rain gutter of the car. The body portion 10 of the bracket member has elongated slots 11 and 12 therethrough, these slots being arranged parallel to the lower edge of the bracket and being spaced apart a substantial distance. The upper edge of the body portion 10 is formed with an inwardly extending rectangular flange 13 and at the lower edge is formed with a pair of longitudinally spaced apart flanges 14 and 15, the body portion having a recess 16 between the flanges 14 and 15. The two flanges 14 and 15 (considered as a unit) and the upper flange 13 converge toward the lower end, and the body portion is cut away at the rear upper side to provide an upwardly extending reduced portion 17. Each of flanges 14 and 15 are preferably slightly curved so as to fit under and partially around the lower side of the rain gutter 4, as best seen in Fig. 4.

In the modern automobile, these rain gutters extend along over the windows on each side of the car body, and down the corner posts on each side of the windshield, where they provide a sloping straight portion of considerable length. (See Fig. 2.) A wedge-shaped plate 18 is adapted to lie on the body portion 10 of the bracket and is formed of a shape to conform in general to that of the body portion; that is, the edges of the plate 18 are at substantially the same angle to each other as are the edges of the body portion. This plate is provided with circular openings of substantially the same diameter as the width of the slots 11 and 12 and these openings are arranged to register with said slots. Bolts 19 and 20 pass through the respective circular openings and the registering slots and these bolts are provided with nuts 21 and 22 for tightening body portion 10 and plate 18 at their bottom edges on opposite sides of the outwardly curved edge of the rain gutter, as shown in Fig. 4.

In order to install the bracket to the side of the windshield, the bolts 19 and 20 are first loosened, or removed entirely, and the curved flanges 14 and 15 are then placed under the gutter in the desired position for the bracket, so that the body portion 10 stands in a substantially vertical position on the gutter. The lower edge of the angular plate 18 is brought into engagement with the inner surface of the gutter, as seen in Figs. 3 and 4, and the plate 18 is then wedged or driven toward the lower front end of the bracket, as by light blows of a hammer. The upper inclined edge of the plate 18 cooperates with the inclined inner face of the flange 13 and the body portion 10 to provide an action which forces the other edge of the plate 18 tightly against the inner surface of the gutter to firmly grip the gutter between it and the curved flanges 14 and 15. When the parts are thus tightly secured together, the nuts 21 and 22 are tightened to maintain the parts in this position.

The upper projecting portion 17 of the bracket is provided with a slot 23 at its upper end adapted to receive the end of the back frame rod 7 of the awning, the ends of this rod acting as trunnions to enable swinging movement of the awning with relation to the brackets when desired. A bearing member 24, of more or less elongated angular shape, is secured by a bolt 25 to the reduced portion 17 after the aperture in the bearing member has been positioned over the rod 7 so as to rotatably maintain rod 7 in position in the inner end of slot 23.

Pivotally mounted in a hole 26 in the forward lower end of body portion 10 is a bent portion 27 of an upwardly extending threaded member 28, which has threaded engagement with a complemental threaded interior bore 29 of the axially aligned member 30. Member 30, at its upper end, is preferably reduced in diameter at 31, the upper end of which is formed with a bent end 32 rotatably mounted in hole 33 in the angular member 34, which in turn is secured by a bolt 35 to the frame member 5 of the awning. This construction, before the parts are assembled, enables member 30 to be adjusted axially of member 28 by relative rotation of these parts until the desired over-all length is obtained; after which the bent ends 27 and 32 will be inserted into their respective openings in the bracket and the awning angular member 34, in which openings these bent ends will be fixed against dislodgment by cotter keys 36 and 37. When the desired over-all length is obtained by threadable adjusting parts 30 and 28, this length may be locked by a lock nut 38.

It is thus seen that by suitable adjustment of the axially aligned members 30 and 28, the awning 1 may be supported in the desired angular position with relation to the windshield, it being kept in mind, as stated above, that there is one of these adjusting members on each side of the awning.

When it is desired to provide additional supporting means for the middle portion of the front edge of the awning, this is accomplished by providing a link 39 pivoted at its lower end to the clamping member 40 adjustably mounted at any desired position longitudinally along the middle bar 41 of the windshield, and pivotally mounted at its top to the support 42 secured, as shown in Fig. 5, to the frame member 6 of the awning. To enable adjustment of clamping member 40 along the middle bar of the windshield, the same is formed of two side arms 43 and 44 which toward their bottom ends are spread outwardly a desired distance so that their lower ends 45 and 46 will grip around and slightly under the said middle bar 41 of the windshield. Arms 43 and 44 are clamped together by tightening bolt 47 until said gripping action occurs at the desired place where they have been positioned. The upper ends of side plates 43 and 44 are pivoted by a bolt, rivet or other suitable means 48 to the bottom end of the link 39. The upper member 42 is formed of angular side plates 49 and 50 which are secured by screws or the like 51 and 52 to the frame member 6 of the awning, these side plates 49 and 50 being pivotally connected by a bolt, rivet or the like 53 to the top end of link 39.

By providing longitudinally spaced apart flanges 14 and 15 on the bracket body portion 10 instead of having this flange extending continuously along the bottom edge of the bracket, we have enabled this bracket to fit the majority of cars on the market, whereas the bracket in said Peckat Patent 2,180,909 was more limited in this regard. This improvement gives the shade more flexibility and makes for a firmer clamping and wedging action of the back plate and bracket on the rain gutters. Also, the improved awning supporting means of the present invention enables the installation of the same awning on different cars that vary greatly in the degree of angle slope of their respective windshields, thus enabling the driver of the car to have a maximum visibility along with the greatest degree of comfort from the glare of the sun. Also, the provision of the middle link 39 and associated parts adjacent the front edge portion of the awning gives the shade more rigidity and provides the distinct advantage of allowing for adjustment to the individual car operator's height. As will be understood in Fig. 2, the two axially aligned adjusting means 28—30 and the link 39 with its associated parts can be proportionately adjusted to prevent cramping or undue warping of the awning and, at the same time, position the awning at any desired angle with relation to the windshield with sufficient rigidity and stability.

We claim:

1. In apparatus for supporting an awning in a desired angular position with respect to the windshield of an automobile having gutters adjacent said windshield, a pair of bracket members each having along one edge a pair of spaced apart flanges adapted to be positioned behind a gutter and clamped thereto, a part of said edge of each bracket member being formed with a recess extending between said flanges, and means for adjustably connecting the awning to the bracket members, whereby said bracket members and the awning may be adjustably secured in different positions with relation to the gutters, each of said bracket members at said recess being formed with an edge extending between said flanges, said last mentioned edge being above the top edge of the adjacent gutter.

2. In apparatus for supporting an awning in a desired position with respect to the windshield of an automobile having gutters adjacent said windshield, a pair of bracket members for supporting the awning, one on one end of the windshield and the other on the other, each of said bracket members having along one edge a pair of spaced apart clamping flanges adapted to be positioned behind one of said gutters and clamped thereto, said edge of each of said bracket members having a cut away portion extending between said flanges, and forming an edge out of contact with the adjacent gutter, and means for engaging the gutter opposite said flanges, said means and flanges comprising the sole clamping means.

3. Apparatus as claimed in claim 2, in which each of said bracket members has a threaded member pivotally connected thereto, and a pair of threaded members pivotally connected to the awning one at each end, said threaded members of the bracket members interengaging the threads of the threaded members of the awning to adjustably hold the threaded members together in alignment in pairs, and said threaded member being connected to the bracket closer to an end thereof than either of said flanges.

4. Apparatus as claimed in claim 2, including at each end of the awning a pair of aligned members threadably interengaged for longitudinal adjustment, one of the aligned members of each pair being pivotally connected to a bracket member at an end of said bracket member and the other being pivotally connected to the awning.

5. In apparatus for supporting an awning in a desired position with respect to the windshield of an automobile having gutters adjacent said windshield, a pair of bracket members each having along one edge a pair of spaced apart clamping flanges, the flanges of the two bracket members being adapted to be gripped behind said gutters, means for engaging said gutters opposite said flanges, said means and flanges forming the sole clamping means in engagement with the gutters, a first threaded member pivotally connected to each of said bracket members, a pair of angle members fixed to the awning one on each side edge, a second threaded member pivotally connected to each of said angle members, said first and second threaded members having their threads interengaged for longitudinal adjustment to adjust the angle of the awning with relation to the windshield, a lock nut on each pair of said threaded members to hold said adjustment until change is desired, a third angle member fixed to an intermediate portion of the awning, a slide member adjustable along the middle bar of the windshield, a link connecting said slide member and said third angle member, and means for selectively locking the slide member in various desired positions along said middle bar of the windshield.

WILLIAM A. MUELLER.
WALTER PECKAT.

REFERENCES CITED

The following references are of record in the file of this patent:

UNITED STATES PATENTS

| Number | Name | Date |
|---|---|---|
| 1,967,898 | Nilson | July 24, 1934 |
| 1,971,366 | Bischof | Aug. 28, 1934 |
| 2,180,909 | Peckat | Nov. 21, 1939 |
| 2,253,353 | Sharp | Aug. 19, 1941 |
| 2,334,856 | Atkinson | Nov. 23, 1943 |
| 2,500,406 | Greenfield | Mar. 14, 1950 |